United States Patent
Cai (10) Patent No.: US 8,155,290 B2
(45) Date of Patent: Apr. 10, 2012

(54) SYSTEMS AND METHODS FOR PROVIDING PER CALL MEASUREMENT DATA IN AN IMS NETWORK

(75) Inventor: Yigang Cai, Naperville, IL (US)

(73) Assignee: Alcatel Lucent, Paris (FR)

( * ) Notice: Subject to any disclaimer, the term of this patent is extended or adjusted under 35 U.S.C. 154(b) by 1223 days.

(21) Appl. No.: 11/554,297

(22) Filed: Oct. 30, 2006

(65) Prior Publication Data

US 2008/0101570 A1    May 1, 2008

(51) Int. Cl.
*H04M 15/00* (2006.01)
(52) U.S. Cl. ......... 379/115.01; 379/114.01; 379/114.03; 379/114.1
(58) Field of Classification Search ............ 379/114.01, 379/114.03, 114.1, 114.21, 114.28, 111, 379/126
See application file for complete search history.

(56) References Cited

U.S. PATENT DOCUMENTS

| 5,768,353 | A   | * | 6/1998 | Browne   | 379/115.03 |
| 7,221,929 | B2  | * | 5/2007 | Lee et al. | 455/408 |
| 2009/0144167 | A1 | * | 6/2009 | Calamera | 705/26 |

* cited by examiner

*Primary Examiner* — Curtis Kuntz
*Assistant Examiner* — Yosef K Laekemariam
(74) *Attorney, Agent, or Firm* — Duft Bornsen & Fishman LLP

(57) ABSTRACT

Systems and methods for providing per call data measurement in an IMS network are provided. An IMS network adapted to provide per call measurement data comprises a plurality of network nodes serving a call for a subscriber adapted to monitor network performance to generate call measurement data for the call. The network nodes further generate charging information for the call and include the call measurement data in the charging information. The network nodes transmit the charging information to a charging system. The charging system is adapted to parse call measurement data from the charging information, and to transmit the call measurement data for the call to a network management system.

20 Claims, 5 Drawing Sheets

SYSTEMS AND METHODS FOR PROVIDING PER CALL MEASUREMENT DATA IN AN IMS NETWORK

BACKGROUND OF THE INVENTION

1. Field of the Invention

The invention is related to the field of communications and, in particular, to systems and methods for measuring per call data for calls in IMS networks.

2. Statement of the Problem

In code division multiple access (CDMA) networks, Per Call Measurement Data (PCMD) servers collect call measurement data on mobile voice and data calls in the network. The collected data includes call details, resource usage, and call failure information. The PCMD server collects data for incomplete calls, such as denied calls and setup failures. The call measurement data collected by the PCMD server may be analyzed by tools or post-processing systems for performance reporting, i.e., call disposition summaries, release cause codes, error codes, etc. The PCMD server provides a more flexible and scalable method of reporting system performance information than is possible with only cumulative counts that cannot be related to individual calls. With cumulative count reporting, the operator will have cumulative counts of call measurement data regarding network performance, but will not be able to view or process call measurement data on a per call basis. The disadvantage with cumulative counts is that important call measurement data may need to be categorized on a per call basis to determine network problems, and the ability to categorize data on a per call basis is not available with cumulative counts.

One type of communication network gaining popularity is an IP Multimedia Subsystem (IMS) network. As set forth in the $3^{rd}$ Generation Partnership Project (3GPP), IMS provides a common core network having access-agnostic network architecture for converged networks. Service providers are accepting this architecture in next generation network evolution. The IMS architecture is initially defined by the 3GPP to provide multimedia services to mobile subscribers over an Internet Protocol (IP) network. IP networks have become the most cost savings bearer network to transmit video, voice, and data. IMS uses the advantage of IP networks to provide multimedia services for IMS subscribers on an IMS platform. The signaling used within IMS networks is Session Initiation Protocol (SIP). IMS defines the standard SIP interface between application servers, the IMS core network (CSCF), the IMS subscriber, the IMS database (HSS), and IMS billing elements. These standards can reduce the network integration costs and let the subscriber enjoy more stable services.

One problem with the present 3GPP IMS standards is that the standards do not define Per Call Measurement Data (PCMD). IMS networks have a different architecture and configuration from legacy networks, such as CDMA, and there are no centralized switching entities, such as a Mobile Switching Center (MSC), in the IMS network to collect per call measurement data. Unfortunately, the current architecture does not provide implementation of the PCMD functionality.

SUMMARY OF THE SOLUTION

This invention solves the above and other problems by providing per call measurement data collection for calls within an IMS network using charging functionality in the IMS network. PCMD allows an IMS network operator to collect per call measurement data including call details, resource usage, and call failure information for monitoring and reporting system performance. When PCMD is used on an IMS network, operators may advantageously monitor system performance based on data collected on a per call basis, rather than on cumulative call counts. The data collected on a per call basis may be used to isolate problems on the IMS network, find common denominators of call failures such as individual user equipment (e.g., a specified mobile phone make and/or model), and identify resource blockage problems.

In one embodiment of the invention, an IMS network adapted to provide per call measurement data comprises a plurality of network nodes serving a call adapted to monitor network performance to generate call measurement data for a call. The network nodes further generate charging information for the call and include the call measurement data in the charging information. The network nodes transmit the charging information to a charging system. The charging system is adapted to parse call measurement data from the charging information, and to transmit the call measurement data for the call to a network management system. The network management system may then process the call measurement data and utilize the information provided to monitor system performance. Another embodiment of the invention is a method of operating an IMS network adapted to provide per call data measurement. The method comprises monitoring network performance to generate call measurement data for the call. The method further comprises generating charging information for the call and including the call measurement data in the charging information. The method further comprises parsing call measurement data from the charging information and transmitting the call measurement data for the call to a network management system.

The invention may include other exemplary embodiments described below.

DESCRIPTION OF THE DRAWINGS

The same reference number represents the same element or the same type of element on all drawings.

DETAILED DESCRIPTION OF THE INVENTION

FIGS. 1-5 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
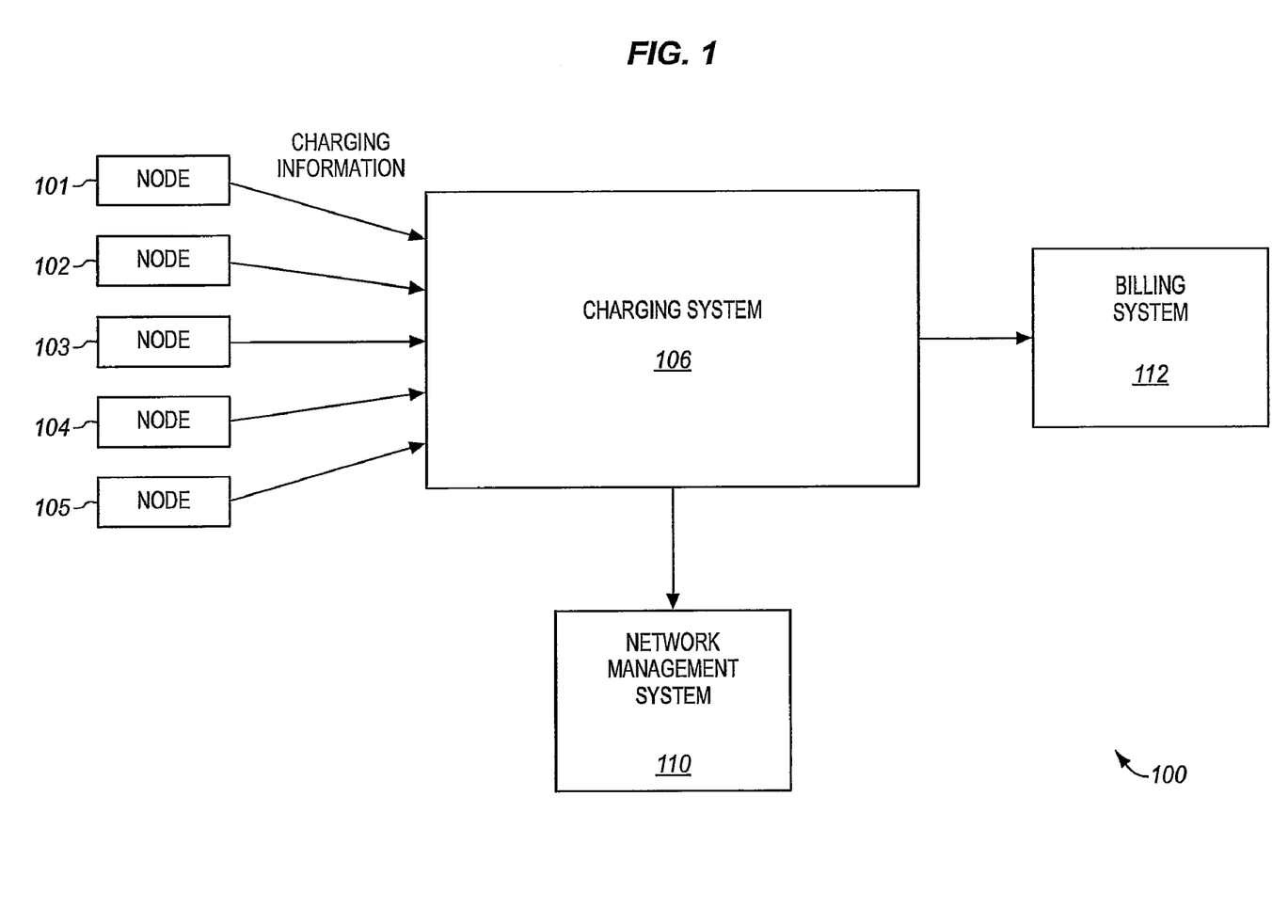
FIG. 1 illustrates an IMS network in an exemplary embodiment of the invention.

FIG. 1 illustrates an IMS network 100 in an exemplary embodiment of the invention. The IMS network 100 includes a plurality of network nodes 101-105, a charging system 106, a billing system 112 and a network management system 110. The network nodes 101-105 comprise any elements, systems, or servers in the IMS network 100 adapted to serve a call. Examples of network nodes 101-105 include a serving-Call Session Control Function (S-CSCF), a proxy-CSCF (P-CSCF), an interrogate-CSCF (I-C SCF), an application server (AS), a Media Gateway Control Function (MGCF), a Breakout Gateway Control Function (BGCF), etc. The network management system 110 comprises any system or server adapted to control, plan, allocate, deploy, coordinate, and/or monitor the resources of IMS network 100. The IMS network 100 may include other networks, systems, or devices not shown in FIG. 1.

The charging system 106 comprises any element, system, or server adapted to interface network nodes 101-105 with a billing system 108. The charging system 106 represents a centralized charging system that collects charging information for a call from the different network nodes 101-105. Examples of the charging system 106 include a Charging Collection Function (CCF) as defined by the 3GPP Release 5 and a Charging Data Function (CDF) as defined by the 3GPP Release 6 in IMS networks. A CCF, for example, traditionally receives charging information from network nodes 101-105 for an IMS call, and generates Charging Data Records (CDR), which are then transmitted to a billing system 108. The CCF then transmits the CDRs to the billing system 108, where the billing system 108 correlates the CDRs for the call and calculates a cost for the call using a rating engine.

In accordance with features and aspects herein, the network nodes 101-105 are further adapted to monitor network performance and to generate call measurement data for the call, and to include the call measurement data in the charging information. Call measurement data may include, for example, call details, resource usage, and call failure information. The network management system 110 may then use the call measurement data to analyze system performance, isolate problems on the network, find common denominators of call failures, such as individual types of user equipment, identify resource blockage problems or create call measurement reports.

When a call is established in IMS network 100, such as an IMS call, a wireless call, etc., for a subscriber, assume that one or more network nodes 101-105 serve the call in some fashion. Responsive to serving the call, network nodes 101-105 generate charging information for the call, and transmit the charging information to the charging system 106.

Figure 2:
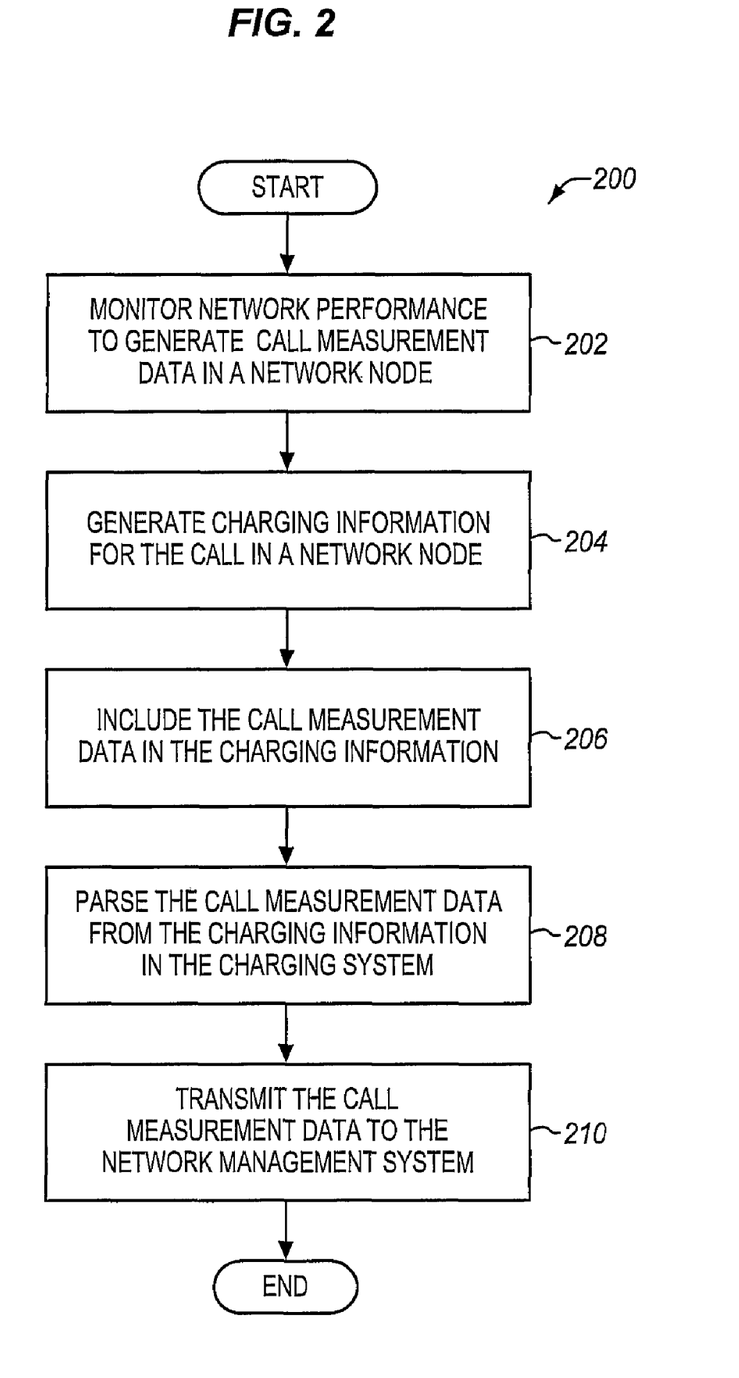
FIG. 2 is a flow chart illustrating a method of operating an IMS network to provide per call measurement data in an exemplary embodiment of the invention.

FIG. 2 is a flow chart illustrating a method 200 of operating IMS network 100 to provide per call data measurement in an exemplary embodiment of the invention. The steps of method 200 will be described with reference to IMS network 100 in FIG. 1. The steps of the flow chart in FIG. 2 are not all inclusive and may include other steps not shown.

Assume for example that network node 101 is a CSCF serving a call for a subscriber. In step 202, the network node 101 monitors network performance to generate call measurement data.

In step 204, the network node 101 generates charging information for the call. In step 206, the network node 101 includes the call measurement data in the charging information. Some existing fields used for charging information may be utilized, and additional fields may be created for the transporting the call measurement data across the IMS network 100.

The charging system 106 receives charging information for the call from network node 101. The charging information may be received by the charging system 106 from the network node 101 as attribute value pairs (AVPs), such as used in the Diameter Rf format. The charging information may include accounting AVPs, as well as call measurement data AVPs. The call measurement data AVPs may include existing accounting AVPs as well as new AVPs comprising fields used for call measurement data. For example, the call measurement data for IMS services may include onnet, offset, call type, call direction, supplementary service type, supplementary service mode, supplementary service action, half call type, etc. For wireless GSM and CDMA roam over the IMS network, additional fields may be used to collect call measurement data. The call measurement data for roaming may include initial and last cell site numbers, start and end cell types, initial and last sector numbers, initial and last channel control units, initial and last channel element numbers, handover indicators, roaming indicators, call and called mobile IDs (MIN, ISMI), etc.

In step 208, the charging system 106 parses call measurement data from the charging information.

In step 210, the charging system 106 transmits the call measurement data for the call to a network management system 110. The call measurement data may be transmitted to the network management system 110 by the charging system 106 under an identifying header, in a single message or report, in multiple messages or reports, etc. The network management system 110 may then perform analysis or post processing of the call measurement data. The call measurement data may be transmitted to the network management system 110 at the end of the call, at a predetermined time or interval during the call, etc.

In one example, assume that a call is served by network node 101 and network node 103. Network node 101 and network node 103 both monitor system performance for the call and generate call measurement data. Further, network node 101 and network node 103 generate charging information, which includes the call measurement data generated by network node 101 and network node 103. Network node 101 and network node 103 each transmit the charging information to the charging system 106. The charging system 106 receives the charging information from network node 101, parses the call measurement data from the charging information, and transmits the measurement data to the network management system 110. The charging system 106 further receives charging information from network node 103, parses the call measurement data from the charging information, and transmits the measurement data to the network management system 110. In response to receiving the call measurement data regarding network node 101 and network node 103, the network management system 110 may perform analysis of system performance. It is also possible the charging system 106 aggregates the measurement data from both network nodes 101 and 103, and sends one PCMD report to the network management system 110.

Figure 3:
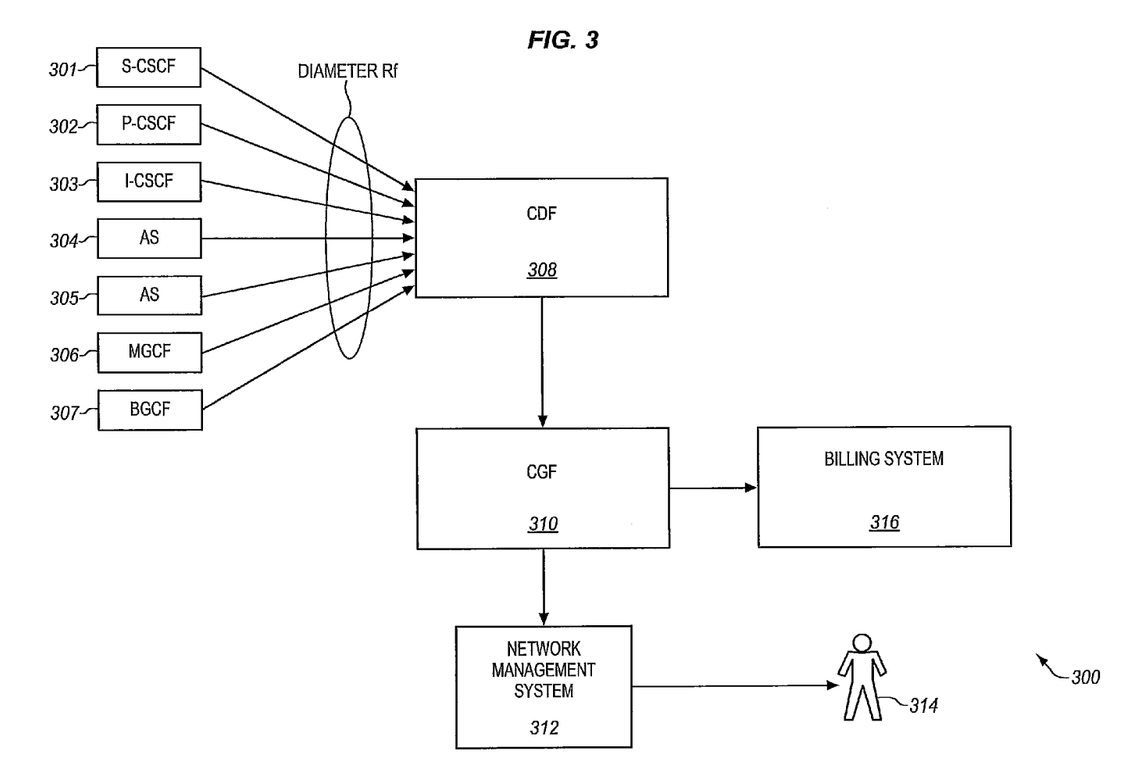
FIG. 3 illustrates an IMS network in another exemplary embodiment of the invention.

FIG. 3 illustrates an IMS network 300 in an exemplary embodiment of the invention. IMS network 300 includes an S-CSCF 301, a P-CSCF 302, an I-CSCF 303, application servers (AS) 304-305, an MGCF 306, a BGCF 307, a CDF 308, a CGF 310, a billing system 316 and a network management system 312. The IMS network 300 is operated by an operator 314. The CDF 308 and the CGF 310 represent the charging system in this embodiment. The charging system may also be represented by a 3GPP Charging Collection Function (CCF). IMS network 300 may include other networks, systems, or devices not shown in FIG. 3.

When an IMS call is established in IMS network 300 for an IMS subscriber, assume that S-CSCF 301, P-CSCF 302, I-CSCF 303, application servers (AS) 304-305, MGCF 306, and BGCF 307 (also referred to as IMS nodes) each serve the IMS call in some fashion. Responsive to serving the IMS call, each IMS node 301-307 monitors network performance and generates call measurement data. To generate call measurement data, the IMS nodes 301-307 populate particular Diameter Rf AVPs specified for call measurement data. The IMS nodes 301-307 further generate charging information for the IMS call, and include the call measurement data in the charging information. The charging information may be in the form of an Accounting Request (ACR) message. The ACR message includes a timestamp, an IMS Charging ID (ICID), a calling party address, a called party address, and the next charging message interval. The ICID is unique for a given call and is used by a billing system 316 to correlate CDRs for the call. The IMS nodes 301-307 then transmit the charging information to the CDF 308 over a Diameter Rf interface.

Responsive to receiving the ACR messages from the IMS nodes 301-307, the CDF 308 processes the ACR message to generate a CDR. The CDR may comprise a complete CDR meaning that the CDR has been generated responsive to the termination of the call. The CDR may also comprise a partial CDR meaning that the CDR has been generated mid-call. Normally, the CDF 308 transmits the CDR to the CGF 310, and the CGF 310 then transmits the CDR to a billing system 316. According to features and aspects herein, the CDF 308 additionally parses call measurement data from the charging information, and transmits the call measurement data to the CGF 310.

The CGF 310 aggregates the call measurement data for the call received from the CDF 308, and transmits the call measurement data to the network management system 312. The aggregation may include combining the call measurement data for multiple network nodes or from multiple charging systems. Alternatively, a charging system such as a CCF may aggregate the call measurement data and transmit the call measurement data to the network management system 312. In the described embodiment, the subscriber may connect with network nodes 301-307. The CDF 308 may collect call measurement data from all of the IMS nodes 301-307, and transmit the call measurement data for all of the IMS nodes 301-307 to the CGF 310.

Alternatively, the CDF 308 may collect measurement data for the call and the CGF 310 may aggregate the call measurement data for a single IMS node 301-307 based on the call. The CGF 310 may aggregate the call measurement data separately for each IMS node 301-307, and transmit the aggregated call measurement data of a single node 301-307 for the call to the network management system 312. For example, a first transmission from the CGF 310 to the network management system 312 may comprise call measurement data for the S-CSCF 301. A second transmission from the CGF to the network management system 312 may comprise call measurement data for the P-CSCF 302. The CGF 310 may make additional transmissions to the network management system 312 for each of the remaining network nodes 303-307.

Figure 4:
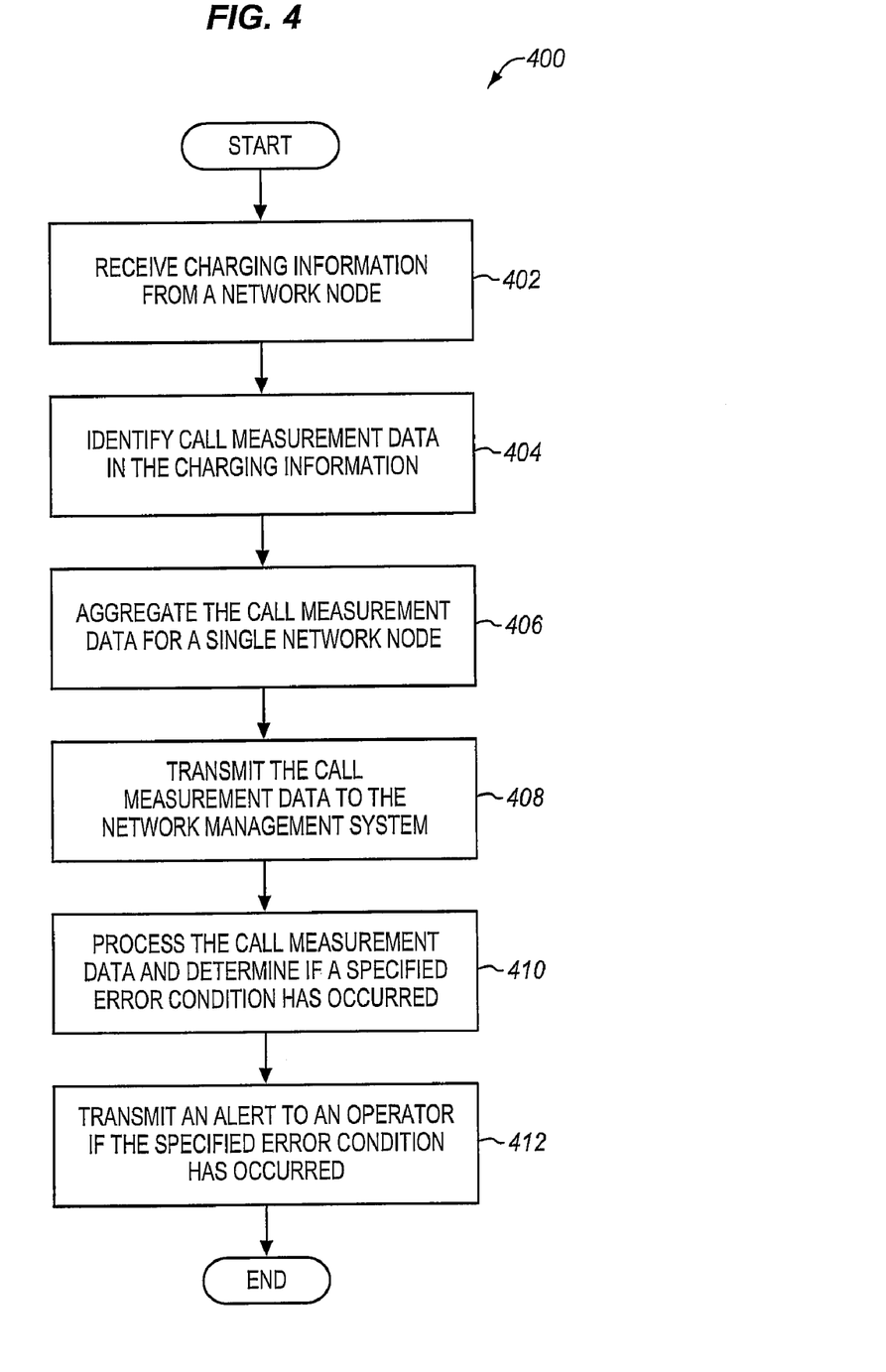
FIG. 4 is a flow chart illustrating a method of operating an IMS network to provide per call measurement data in another exemplary embodiment of the invention.

Unusual circumstances may occur on the IMS network 300 which may require intervention by the operator 314. FIG. 4 is a flow chart illustrating a method 400 of operating IMS network 300 for using PCMD to alert an operator 314 of a specified error condition, such as a network failure, in an exemplary embodiment of the invention. The steps of method 400 will be described with reference to the IMS network 300 in FIG. 3. The steps of the flow chart in FIG. 4 are not all inclusive and may include other steps not shown.

In step 402, the CDF 308 receives the charging information for the call from network nodes 301-307. The charging information may be received by the CDF 308 from the network nodes 301-307 as AVPs.

In step 404, the CDF 308 identifies call measurement data in the charging information. For example, the CDF 308 may identify AVPs that are used for PCMD and separate the call measurement data AVPs from AVPs used by the billing system 316. The CDF 308 or other charging system may be adapted to allow an operator 314 to specify the attribute value pairs to be transmitted to the network management system 312. For example, the operator 314 may specify an AVP representing a call failure reason to be transmitted to the network management system 312. The CDF 308 transmits the identified call measurement data to the CGF 310 for aggregation.

In step 406, the CGF 310 aggregates the call measurement data. For instance, the CGF 310 may aggregate call measurement data for a single IMS node 301-307. For example, call measurement data received by the CGF 310 may represent a plurality of network nodes 301-307, and the CGF 310 may aggregate the call measurement data for the S-CSCF 301.

In step 408, the CGF 310 transmits the aggregated measurement data for the call to the network management system 312. In step 410, the network management system 310 processes the call measurement data, and determines if a specified error condition has occurred. In step 412, if the network management system 312 determines that the specified error condition has occurred, then the network management system 312 transmits an alert to the operator 314. In response to receiving the alert, the operator 314 may take corrective action to remedy the specified condition.

A CGF 310 or other data measurement system may be further adapted to generate measurement reports based on the call measurement data and transmit the measurement report to the network management system 312. The measurement report presents the call measurement data in a format that the network management system 312 understands, and may include additional information regarding the call, such as a call final class. For example, each measurement report generated by the CGF 310 may represent a single IMS node (301-307) for a single call.

Figure 5:
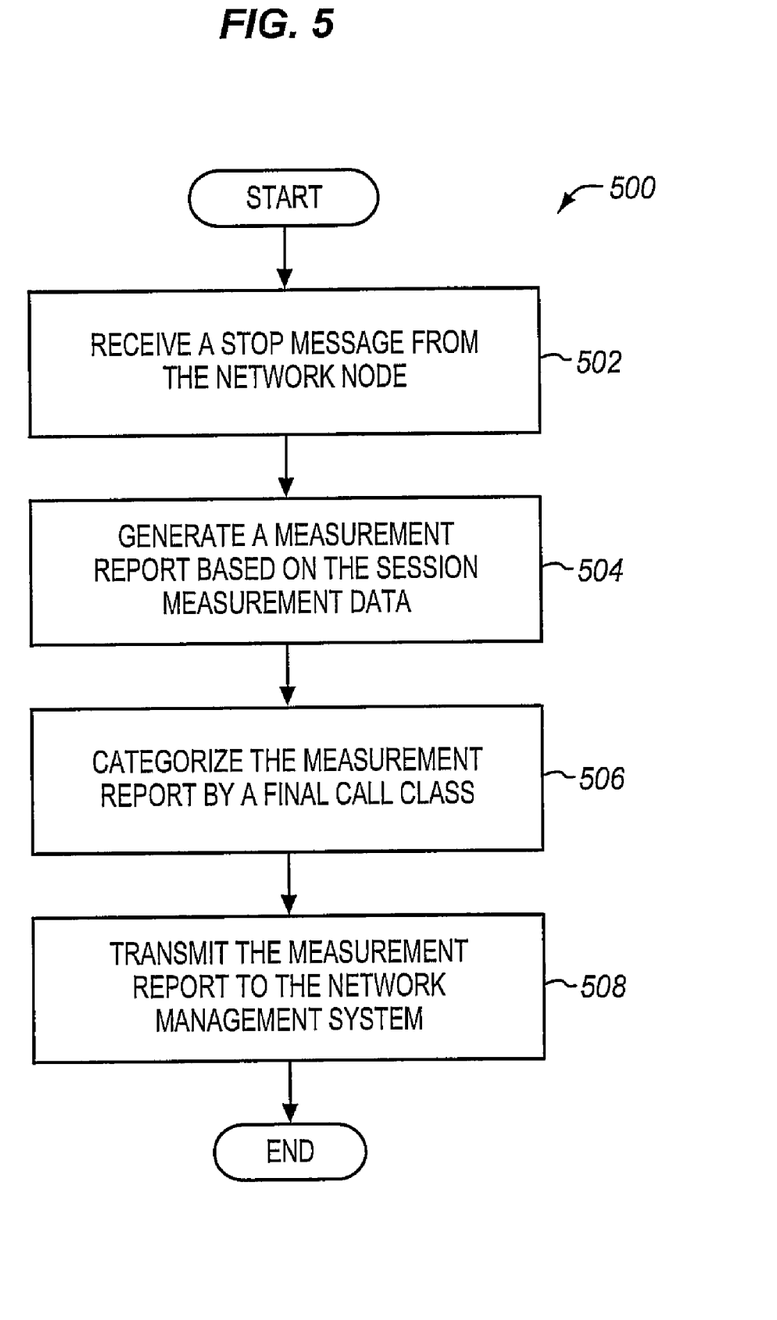
FIG. 5 is a flow chart illustrating a method of operating an IMS network to provide per call measurement data in another exemplary embodiment of the invention.

FIG. 5 is a flow chart illustrating a method 500 of operating IMS network 300 for using PCMD to generate measurement reports based on the call measurement data aggregated by the CGF 310 in an exemplary embodiment of the invention. The steps of method 500 will be described with reference to IMS network 300 in FIG. 5. The steps of the flow chart in FIG. 5 are not all inclusive and may include other steps not shown. The measurement report may be transmitted by the CGF 310 to the network management system 312 in place of the call measurement data. Method 500 is a detailed description of step 410 of method 400.

In step 502, the CGF 310 receives a stop message from an IMS node 301-307. The stop message represents the end of the call. In step 504, in response to receiving the stop message from the IMS node 301-307, the CGF 310 generates a measurement report based on the aggregated call measurement data received from the CDF 308. A measurement report may also be generated mid-call, for example, at a predetermined time or interval.

In step 506, the CGF 310 categorizes the measurement report based on a call final class (CFC). A CFC categorizes the disposition of the call. The CFC allows accurate end-of-call summaries at any level of resolution (per call type, per channel group, etc.). The CFC may enable post-processing of call data to summarize failure types and determine root causes of call failures. The CFC classifications include normal calls, dropped calls, subscriber accounts, authorization or security failures, location or paging related failures, CSCF related failures or blockages, MGW-related failures or blockages, PSTN side failures or blockages, RAN side failures or blockages, signaling related failures, call established but dropped, origination failures, termination failures, short message service, multimedia message service, push-to-talk, push-to-connect, video streams, etc.

In step 508, the CGF 310 transmits the measurement report to the network management system 312. Based on the CFC, the network management system 312 may use the provided measurement report to analyze system performance, create reports based on the CFC, use the call resource data and/or cause codes to isolate problems on the IMS network 300, find common denominators of call failures, etc.

Although specific embodiments were described herein, the scope of the invention is not limited to those specific embodiments. The scope of the invention is defined by the following claims and any equivalents thereof.

I claim:

1. An IP Multimedia Subsystem (IMS) network adapted to provide per call measurement data, the IMS network comprising:
    a plurality of network nodes serving a call for a subscriber, each network node adapted to generate call measurement data for the call that describes network performance for the call, to generate charging information for the call, to include the charging information in a charging request, to include the call measurement data in the charging request, and to transmit the charging request; and
    a charging system adapted to receive charging requests from the network nodes, to parse the call measurement data from the charging requests, and to transmit the call measurement data for the call to a network management system.

2. The IMS network of claim 1 wherein the charging system is further adapted to aggregate the call measurement data for the call received from each network node, and to transmit the aggregated call measurement data for the call to the network management system.

3. The IMS network of claim 1 wherein the charging system comprises a 3GPP Charging Data Function (CDF) and a Charging Gateway Function (CGF).

4. The IMS network of claim 1 wherein the charging system comprises a 3GPP Charging Collection Function (CCF).

5. The IMS network of claim 1 wherein the call measurement data is in the format of attribute value pairs, and the charging system is adapted to allow an operator to specify fields of the attribute value pairs to be transmitted to the network management system.

6. The IMS network of claim 1 wherein the network management system is further adapted to process the call measurement data and to transmit an alert to an operator based on a determination that a specified error condition has occurred.

7. The IMS network of claim 1 wherein the charging system is further adapted to process the call measurement data and to generate a measurement report based on the call measurement data, wherein the measurement report presents the call measurement data in a format compatible with the network management system, and to transmit the measurement report to the network management system.

8. The IMS network of claim 7 wherein the measurement report is categorized by a call final class, and wherein the call final class indicates information on how a call ended.

9. The IMS network of claim 1 wherein the plurality of network nodes transmits the charging information to the charging system in a Diameter Rf format.

10. A method of operating an IP Multimedia Subsystem (IMS) network adapted to provide per call measurement data, the method comprising:
    monitoring, at a plurality of network nodes, network performance to generate call measurement data for the call the describes network performance for the call;
    generating charging information for the call;
    including the charging information in a charging request;
    including the call measurement data in the charging request;
    parsing call measurement data from the charging request at a charging system of the IMS network; and
    transmitting the call measurement data for the call from the charging system to a network management system.

11. The method of claim 10 further comprising:
    aggregating the call measurement data for the call received from each network node; and
    transmitting the aggregated call measurement data for the call to the network management system.

12. The method of claim 10 further comprising:
    formatting the call measurement data as attribute value pairs; and
    allowing an operator to specify fields of the attribute value pairs to be transmitted to the network management system.

13. The method of claim 10 further comprising:
    processing the call measurement data; and
    transmitting an alert to an operator based on a determination that a specified error condition has occurred.

14. The method of claim 10 further comprising:
    processing the call measurement data;
    generating a measurement report based on the call measurement data, wherein the measurement report presents the call measurement data in a format compatible with the network management system; and
    transmitting the measurement report to the network management system.

15. The method of claim 14 wherein the generation of the measurement report step occurs in response to receiving a stop message from a network node.

16. The method of claim 14 further comprising categorizing the measurement report by a call final class, wherein the call final class indicates information on how a call ended.

17. An IP Multimedia Subsystem (IMS) network adapted to provide per call measurement data, the IMS network comprising:
    a first charging system adapted to receive a charging request comprising charging information and also comprising call measurement data that describes network performance for a call in a Diameter Rf format from a plurality of network nodes serving the call for a subscriber, to parse the call measurement data from the charging request, and to transmit the call measurement data;
    a second charging system adapted to receive the call measurement data from the first charging system, to aggregate the call measurement data for the call, and to transmit the aggregated call measurement data; and
    a network management system adapted to receive the call measurement data from the second charging system and to process the call measurement data.

18. The IMS network of claim 17 wherein the first charging system comprises a 3GPP Charging Data Function (CDF).

19. The IMS network of claim 17 wherein the first charging system and the second charging system comprise a 3GPP Charging Collection Function (CCF).

20. The IMS network of claim 17 wherein the second charging system comprises a 3GPP Charging Gateway Function (CGF).

* * * * *

UNITED STATES PATENT AND TRADEMARK OFFICE
CERTIFICATE OF CORRECTION

PATENT NO.          : 8,155,290 B2
APPLICATION NO.     : 11/554297
DATED               : April 10, 2012
INVENTOR(S)         : Cai et al.

It is certified that error appears in the above-identified patent and that said Letters Patent is hereby corrected as shown below:

In column 4, line 7, the text "may include onnet, offset, call type," should read -- may include onnet, offnet, call type, --

Signed and Sealed this
Twenty-second Day of May, 2012

David J. Kappos
*Director of the United States Patent and Trademark Office*